US012167511B2

(12) United States Patent
Bilat et al.

(10) Patent No.: US 12,167,511 B2
(45) Date of Patent: *Dec. 10, 2024

(54) AEROSOL-GENERATING ARTICLE HAVING A LIQUID INDICATOR

(71) Applicant: Altria Client Services LLC, Richmond, VA (US)

(72) Inventors: Stephane Bilat, Areuse (CH); Guillaume Colotte, Arnex sur Orbe (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,229

(22) Filed: May 1, 2023

(65) Prior Publication Data

US 2023/0276537 A1 Aug. 31, 2023

Related U.S. Application Data

(63) Continuation of application No. 16/807,427, filed on Mar. 3, 2020, now Pat. No. 11,641,697, which is a (Continued)

(30) Foreign Application Priority Data

May 27, 2016 (EP) .................................... 16171790

(51) Int. Cl.
*H05B 3/04* (2006.01)
*A24F 40/10* (2020.01)
(Continued)

(52) U.S. Cl.
CPC ............... *H05B 3/04* (2013.01); *A24F 40/42* (2020.01); *A24F 40/50* (2020.01); *A24F 40/60* (2020.01);
(Continued)

(58) Field of Classification Search
None
See application file for complete search history.

(56) References Cited

U.S. PATENT DOCUMENTS 6,680,205 B1 1/2004 Elhard et al.
8,881,737 B2 * 11/2014 Collett .................... A24F 40/30 131/194
(Continued)

FOREIGN PATENT DOCUMENTS

CN 101426686 A 5/2009
CN 203388263 U 1/2014
(Continued)

OTHER PUBLICATIONS

Extended European Search Report #16171790.5 dated Mar. 24, 2017.
(Continued)

*Primary Examiner* — Thor S Campbell
(74) *Attorney, Agent, or Firm* — Harness, Dickey & Pierce, P.L.C.

(57) ABSTRACT

An aerosol-generating article may comprise a liquid storage portion containing a liquid aerosol-forming substrate, and a hydrochromic material provided on the liquid storage portion. The hydrochromic material has a first colour when in the presence of or when in contact with the liquid aerosol-forming substrate and a second colour when in the absence of or when not in contact with the liquid aerosol-forming substrate. An aerosol-generating system may comprise the aerosol-generating article, an aerosol-generating element, and an aerosol-generating device. An aerosol-generating device may comprise an electrical power supply, an electronic photosensor, and a controller configured to control a
(Continued)

supply of electrical power from the electrical power supply based on a value of an optical property sensed with the electronic photosensor.

18 Claims, 2 Drawing Sheets

Related U.S. Application Data continuation of application No. 15/606,096, filed on May 26, 2017, now Pat. No. 10,609,959, which is a continuation of application No. PCT/EP2017/060939, filed on May 8, 2017.

(51) Int. Cl.

| | |
|---|---|
| ***A24F 40/42*** | (2020.01) |
| ***A24F 40/50*** | (2020.01) |
| ***A24F 40/60*** | (2020.01) |
| ***B67D 7/42*** | (2010.01) |
| ***F22B 1/28*** | (2006.01) |
| ***F22B 35/00*** | (2006.01) |
| ***H05B 3/44*** | (2006.01) |
| ***H05B 6/10*** | (2006.01) |

(52) U.S. Cl.

CPC .............. *B67D 7/426* (2013.01); *F22B 1/284* (2013.01); *F22B 35/005* (2013.01); *H05B 3/44* (2013.01); *H05B 6/108* (2013.01); *A24F 40/10* (2020.01); *H05B 2203/014* (2013.01); *H05B 2203/021* (2013.01); *H05B 2203/022* (2013.01); *H05B 2203/032* (2013.01)

(56) References Cited

U.S. PATENT DOCUMENTS

| | | | | |
|---|---|---|---|---|
| 11,641,697 | B2 * | 5/2023 | Bilat | H05B 3/44 392/404 |
| 2005/0276937 | A1 * | 12/2005 | Kosth | B65D 1/265 428/34.1 |
| 2008/0276976 | A1 * | 11/2008 | Buller | A47L 15/4293 345/173 |
| 2011/0217544 | A1 * | 9/2011 | Young | H01L 31/055 977/773 |
| 2014/0060554 | A1 | 3/2014 | Collett et al. | |
| 2014/0088534 | A1 | 3/2014 | Kanakkanatt et al. | |
| 2016/0061793 | A1 * | 3/2016 | Hansmann | G01N 31/222 436/39 |
| 2016/0077073 | A1 * | 3/2016 | Hansmann | G01N 21/783 436/39 |
| 2017/0340010 | A1 * | 11/2017 | Bilat | F22B 1/284 |
| 2020/0196665 | A1 * | 6/2020 | Bilat | B67D 7/426 |
| 2021/0003564 | A1 * | 1/2021 | Rao | C12N 9/0006 |
| 2023/0276537 | A1 * | 8/2023 | Bilat | A24F 40/42 392/404 |

FOREIGN PATENT DOCUMENTS

| | | | |
|---|---|---|---|
| CN | 104768407 | A | 7/2015 |
| DE | 202004017418 | U1 | 1/2005 |
| EA | 23124 | B1 | 4/2016 |
| EP | 2201850 | A1 | 6/2010 |
| JP | 2008-502551 | A | 1/2008 |
| RU | 103281 | U1 | 4/2011 |
| RU | 2517100 | C2 | 5/2014 |
| WO | WO-2013060743 | A2 | 5/2013 |
| WO | WO-2013/116572 | A1 | 8/2013 |
| WO | WO-2014/037794 | A2 | 3/2014 |
| WO | WO-2014052549 | A1 | 4/2014 |
| WO | WO-2015042412 | A1 | 3/2015 |
| WO | WO-2015082560 | A1 | 6/2015 |
| WO | WO-2015150068 | A1 | 10/2015 |
| WO | WO-2016/005602 | A1 | 1/2016 |

OTHER PUBLICATIONS

Partial International Search Report and Written Opinion dated May 30, 2017 for corresponding International Application No. PCT/EP2017/060939.

http://lcrhallcrest.com/chameleoninks/hydrochromic.php.

http://colourchangingink.com/.

http://www.yanseco.com/en/3-product.asp?Id=136.

http://matsui-color.com/waterbaseinkthermochromicinks/hydrochromic/.

http://www.mindsetsonline.co.uk/Catalogue/ProductDetail/hydrochromic-paint?productID=b08c0a19-f249-449f-a296-f53d8b960731&catalogueLevelItemID=6701f532-3b4a-451b-b922-ba635d80b20b.

Written Opinion for Application No. PCT/EP2017/060939 dated Aug. 10, 2017.

International Preliminary Report on Patentability for corresponding International Application No. PCT/EP2017/060939 dated Dec. 6, 2018.

Extended European Search Report dated May 6, 2020 for corresponding European Application No. 20166260.8.

Office Action and Search Report for Russian Application No. 2018142130/03 (Jul. 2, 2015) dated Aug. 11, 2020 and English translation.

International Search Report and Written Opinion for PCT/EP2017/060939 dated Aug. 11, 2017.

Office Action for corresponding Chinese Application No. 201780027359.X dated Dec. 28, 2020 and English translation.

Search Report for corresponding Russian Application No. 2018142130 dated Dec. 8, 2020 and English translation.

Office Action for corresponding Japanese Application No. 2018-556489 dated Mar. 3, 2021 and English translation.

Office Action for Russian Application No. 2018142130 dated Aug. 4, 2021 and English translation.

Office Action dated Oct. 6, 2021 issued in corresponding Japanese Patent Application No. 2018-556489.

Office Action for Chinese Application No. 201780027359.X dated Dec. 6, 2021 and English translation.

Office Action for Japanese Application No. 2018-556489 dated Mar. 28, 2022 and English translation.

Office Action for Korean Application No. 10-2018-7031422 dated Apr. 28, 2022 and English translation.

Office Action for Chinese Application No. 201780027359..X dated Apr. 26, 2022 and English translation.

Notice of Allowance dated Oct. 25, 2022 issued in corresponding Korean patent application No. 10-2018-7031422.

* cited by examiner

AEROSOL-GENERATING ARTICLE HAVING A LIQUID INDICATOR

CROSS-REFERENCE TO RELATED APPLICATIONS

This application is a continuation of U.S. application Ser. No. 16/807,427, filed on Mar. 3, 2020, which is a continuation of U.S. application Ser. No. 15/606,096, filed on May 26, 2017, which is a continuation of and claims priority to PCT/EP2017/060939, filed on May 8, 2017, and further claims priority to EP 16171790.5, filed on May 27, 2016, the contents of each of which are hereby incorporated by reference in their entirety.

BACKGROUND

Field

The present disclosure relates to an aerosol-generating article comprising a hydrochromic material, an aerosol-generating system comprising the aerosol-generating article, and an aerosol-generating device comprising an electronic photosensor.

Description of Related Art

One type of aerosol-generating system is an electronic cigarette. Electronic cigarettes typically use a liquid aerosol-forming substrate which is vaporised to form an aerosol. An electronic cigarette typically comprises a power supply, a liquid storage portion for holding a supply of the liquid aerosol-forming substrate, and an atomiser.

The liquid aerosol-forming substrate needs to be replenished when depleted. The most common way to supply refills of liquid aerosol-forming substrate is in a cartomiser-type cartridge. The cartomiser may be regarded as a consumable aerosol-generating article, and the reusable part of the electronic cigarette may be regarded as an aerosol-generating device. A cartomiser may comprise both a supply of liquid substrate and the atomiser, usually in the form of an electrically-operated resistance heater wound around a capillary material soaked in the aerosol-forming substrate. Replacing a cartomiser as a single consumable unit avoids the need to clean or otherwise maintain the atomiser. However, it may be difficult to determine when the liquid aerosol-forming substrate in a cartomiser has been exhausted. Therefore, it may be difficult to determine when to replace a consumable part of an aerosol-generating system, such as the cartomiser of an electronic cigarette.

SUMMARY

According to some example embodiments, there is provided an aerosol-generating article comprising a storage portion (e.g., liquid storage portion) containing an aerosol-forming substrate (e.g., liquid aerosol-forming substrate), and a hydrochromic material provided on the storage portion. The hydrochromic material has a first colour in the presence of or when in contact with the aerosol-forming substrate and a second colour in the absence of or when not in contact with the aerosol-forming substrate.

As used herein, the term "aerosol-forming substrate" is used to describe a substrate capable of releasing volatile compounds, which can form an aerosol. The aerosols generated from aerosol-forming substrates of aerosol-generating articles may be visible or invisible and may include vapours (for example, fine particles of substances, which are in a gaseous state, that are ordinarily liquid or solid at room temperature) as well as gases and liquid droplets of condensed vapours.

Aerosol-generating articles according to some example embodiments comprise a hydrochromic material configured to exhibit a change in colour when the liquid aerosol-forming substrate has been exhausted. The hydrochromic material provides a relatively simple and cost-effective indication of exhaustion of the liquid aerosol-forming substrate.

The aerosol-generating articles herein may minimise the risk of discarding the aerosol-generating articles before all of the liquid aerosol-forming substrate has been depleted.

The aerosol-generating articles may also minimise the risk of continuing to use the aerosol-generating article after all of the liquid aerosol-forming substrate has been depleted. In example embodiments in which the liquid aerosol-forming substrate is heated to generate an aerosol, minimising the risk of continued heating of a dry aerosol-generating article may be desirable to prevent the release of one or more undesirable substances from the aerosol-generating article.

The hydrochromic material may be provided as a coating on at least a portion of the liquid storage portion. The hydrochromic material may comprise at least one of an ink and a paint. Hydrochromic inks and paints may be beneficial in example embodiments in which the hydrochromic material is provided as a coating.

One of the first colour and the second colour may be a condition in which the hydrochromic material is substantially colourless. The term "colourless" is used herein to refer to a state wherein a material transmits light substantially equally across the visible portion of the electromagnetic spectrum.

At least one of the first colour and the second colour may be translucent or transparent. Translucent and transparent materials transmit at least 50 percent of incident light for at least one wavelength in the visible portion of the electromagnetic spectrum. The term "translucent" is used herein to refer to a material that transmits light with scattering. The term "transparent" is used herein to refer to a material that transmits light substantially without scattering.

Translucent and transparent materials may be substantially colourless.

Translucent and transparent materials may transmit some wavelengths of light more than others so that the translucent or transparent material is not colourless.

At least one of the first colour and the second colour may be opaque. The term "opaque" is used herein to refer to a state wherein a material reflects or absorbs more than 50 percent of incident light for all wavelengths of the visible portion of the electromagnetic spectrum. An opaque material that absorbs all wavelengths exhibits a black colour. An opaque material that reflects all wavelengths exhibits a colour corresponding to the colour of the incident light. An opaque material that absorbs some wavelengths and reflects the remaining wavelengths exhibits a colour corresponding to the combination of the reflected wavelengths of the incident light.

The hydrochromic material may comprise one or more pigments or dyes to provide a desired first colour, second colour, or both. The hydrochromic material may comprise one or more inorganic pigments or dyes. Alternatively, or in addition to the inorganic pigments or dyes, the hydrochromic material may comprise one or more organic pigments or dyes. Suitable pigments and dyes include azo dyes, anthraquinone dyes, xanthene dyes, azine dyes, and combinations thereof.

The hydrochromic material may gradually change from the first colour to the second colour as the liquid aerosol-forming substrate is depleted during the use of the aerosol-generating article. In this way, the hydrochromic material may provide an indication of the amount of liquid aerosol-forming substrate remaining in the liquid storage portion. For example, in non-limiting embodiments in which the first colour is translucent or transparent and the second colour is an opaque colour, the hydrochromic material may exhibit a gradual increase in opacity as the liquid aerosol-forming substrate is depleted.

The liquid aerosol-forming substrate may comprise water. In an example embodiment, the hydrochromic material changes colour in response to the presence or absence of water.

The hydrochromic material may comprise at least one of a finely particulate silicic acid, a barite powder, precipitated barium sulfate, barium carbonate, precipitated calcium carbonate, gypsum, clay, talc, alumna white, basic magnesium carbonate, and combinations thereof.

The aerosol-generating article may comprise a base layer, wherein the liquid storage portion comprises a porous substrate material positioned on the base layer and the liquid aerosol-forming substrate sorbed into the porous substrate material. The hydrochromic material may be provided on an outer surface of the porous substrate material. The hydrochromic material may be provided on a surface of the porous substrate material for enhanced visibility.

The aerosol-generating article may comprise a single porous substrate material and a single liquid aerosol-forming substrate sorbed into the porous substrate material.

Alternatively, the aerosol-generating article may comprise a plurality of discrete segments of porous substrate material positioned on the base layer, wherein the liquid aerosol-forming substrate comprises a liquid aerosol-forming substrate sorbed into each segment of porous substrate material. The liquid aerosol-forming substrates may be substantially the same. At least one of the liquid aerosol-forming substrates may be different from the other liquid aerosol-forming substrates.

Each porous substrate material may have a density of between about 0.1 grams/cubic centimetres and about 0.3 grams/cubic centimetres.

Each porous substrate material may have a porosity of between about 15 percent and about 55 percent.

Each porous substrate material may comprise one or more of glass, cellulose, ceramic, stainless steel, aluminium, polyethylene (PE), polypropylene, polyethylene terephthalate (PET), poly(cyclohexanedimethylene terephthalate) (PCT), polybutylene terephthalate (PBT), polytetrafluoroethylene (PTFE), expanded polytetrafluoroethylene (ePTFE), and BAREX®.

In an example embodiment, each porous carrier material is chemically inert with respect to the liquid aerosol-forming substrate sorbed into the porous carrier material.

The base layer and each porous carrier material may be in contact with each other at a substantially planar contact surface. Providing each porous carrier material on a substantially planar portion of the base layer may simplify the manufacture of the aerosol-generating article.

As used herein, the term "substantially planar", means arranged substantially along a single plane.

The aerosol-generating article may comprise a cover layer sealed to the base layer so that each porous substrate material is sealed between the base layer and the cover layer. The cover layer may be sealed to the base layer around a periphery of the base layer.

The cover layer may be configured to be removable from the base layer prior to use of the aerosol-generating article.

Alternatively, the cover layer may be configured to remain on the base layer during use of the aerosol-generating article. For example, the cover layer may be pierced prior to use of the aerosol-generating article. In non-limiting embodiments in which the cover layer is configured to remain on the base layer during use of the aerosol-generating article, at least a portion of the cover layer overlying the hydrochromic material may be translucent or transparent.

The base layer may have any suitable cross-sectional shape. In an example embodiment, the base layer has a non-circular cross-sectional shape. For instance, the base layer may have a substantially rectangular cross-sectional shape. The base layer may have an elongate, substantially rectangular, parallelepiped shape. The base layer may be substantially flat. The base layer may be substantially planar. A substantially planar base layer may be suited to aerosol-generating articles comprising at least one solid aerosol-forming substrate. The base layer may comprise a polymeric foil.

The liquid aerosol-forming substrate may comprise a liquid nicotine source sorbed into a porous substrate material.

The liquid nicotine source may comprise one or more of nicotine, nicotine base, a nicotine salt, such as nicotine-HCl, nicotine-bitartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent or a liquid tobacco extract.

The nicotine source may comprise an electrolyte-forming compound. The electrolyte-forming compound may be selected from the group consisting of alkali metal hydroxides, alkali metal oxides, alkali metal salts, alkaline earth metal oxides, alkaline earth metal hydroxides, and combinations thereof.

The nicotine source may comprise an electrolyte-forming compound selected from the group consisting of potassium hydroxide, sodium hydroxide, lithium oxide, barium oxide, potassium chloride, sodium chloride, sodium carbonate, sodium citrate, ammonium sulfate, and combinations thereof.

The nicotine source may comprise an aqueous solution of nicotine, nicotine base, a nicotine salt, or a nicotine derivative and an electrolyte-forming compound.

The nicotine source may comprise other components including, but not limited to, natural flavours, artificial flavours, and antioxidants.

The liquid aerosol-forming substrate may comprise a first liquid aerosol-forming substrate comprising the nicotine source sorbed into a first porous substrate material, and a second liquid aerosol-forming substrate comprising an acid source sorbed into a second porous substrate material. During use, volatile compounds from the nicotine source and the acid source may react in the gas phase to form an aerosol comprising nicotine salt particles.

The acid source may comprise an organic acid or an inorganic acid. In a non-limiting embodiment, the organic acid may be a carboxylic acid (e.g., an alpha-keto or 2-oxo acid or lactic acid).

In some example embodiments, the acid source comprises an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid, lactic acid, and combinations thereof. For instance, the acid source may comprise pyruvic acid or lactic acid. In another instance, the acid source may comprise lactic acid.

The liquid storage portion may comprise a liquid storage container containing the liquid aerosol-forming substrate, wherein the hydrochromic material is provided on an internal surface of the liquid storage container. In an example embodiment, at least a portion of the liquid storage container overlying the hydrochromic material is substantially translucent or substantially transparent. A substantially translucent or substantially transparent portion of the liquid storage container may allow an observation of the colour of the hydrochromic material during use of the aerosol-generating article.

The liquid storage container may be formed from a substantially transparent material, such as ALTUGLAS® Medical Resins Polymethlymethacrylate (PMMA), Chevron Phillips K-Resin® Styrene-butadiene copolymer (SBC), Arkema special performance polymers Pebax®, Rilsan®, and Rilsan® Clear, DOW (Health+™) Low-Density Polyethylene (LDPE), DOW™ LDPE 91003, DOW™ LDPE 91020 (MFI 2.0; density 923), ExxonMobil™ Polypropylene (PP) PP1013H1, PP1014H1 and PP9074MED, Trinseo CALIBRE™ Polycarbonate (PC) 2060-SERIES. The liquid storage container may be moulded, such as by in an injection moulding process.

In an example embodiment, the liquid storage container defines an outlet in the liquid storage container for delivery of the liquid aerosol-forming substrate from the liquid storage container. The outlet may be provided in an end of the liquid storage container. The liquid storage container may comprise a substantially cylindrical container having a closed end and an open end, and a lid comprising the outlet and extending across the open end. The lid may be configured to engage the substantially cylindrical container with an interference fit.

The aerosol-generating article may further comprise a liquid transport element extending through the outlet, the liquid transport element having a first end positioned within the liquid storage container. The liquid transport element may facilitate controlled delivery of the liquid aerosol-forming substrate from the liquid storage container, through the outlet.

The liquid transport element may comprise a capillary wick. The capillary wick may be formed from capillary fibres, including glass fibres, carbon fibres, and metallic fibres, or a combination of any and all of glass fibres, carbon fibres and metallic fibres. Providing metallic fibres may enhance the mechanical resistance of the wick without negatively affecting the hydrophobic properties of the overall wick. Such fibres may be provided parallel to the central axis of the wick, and may be braided, twisted, or partially non-woven.

The capillary wick may have a fibrous or spongy structure. The capillary wick may comprise a bundle of capillaries. For example, the capillary wick may comprise a plurality of fibres or threads, or other fine bore tubes. The fibres or threads may be generally aligned in a longitudinal direction of the aerosol-generating article. The capillary wick may comprise sponge-like or foam-like material formed into a rod shape. The structure of the wick forms a plurality of small bores or tubes, through which the liquid aerosol-forming substrate can be transported by capillary action. The capillary wick may comprise any suitable material or combination of materials. Examples of suitable materials are ceramic- or graphite-based materials in the form of fibres or sintered powders. The capillary wick may have any suitable capillarity and porosity so as to be used with different liquid physical properties such as density, viscosity, surface tension, and vapour pressure. The capillary properties of the wick, combined with the properties of the liquid aerosol-forming substrate, ensure that the wick remains in contact with the liquid aerosol-forming substrate as long as there is liquid aerosol-forming substrate remaining in the liquid storage container.

The liquid aerosol-forming substrate may comprise a tobacco-containing material containing volatile tobacco flavour compounds which are released from the substrate upon heating. The liquid aerosol-forming substrate may comprise a non-tobacco material. The liquid aerosol-forming substrate may comprise a tobacco-containing material and a non-tobacco containing material. The liquid aerosol-forming substrate may comprise nicotine.

The liquid aerosol-forming substrate may comprise an aerosol former.

The aerosol-generating article may further comprise an aerosol-generating element configured for aerosolising the liquid aerosol-forming substrate.

In example embodiments in which the aerosol-generating article comprises a liquid transport element having a first end positioned within a liquid storage container, the aerosol-generating element may be positioned to aerosolise the liquid aerosol-forming substrate at a second end of the liquid transport element. In use, liquid aerosol-forming substrate is transferred from the liquid storage container towards the aerosol-generating element along the liquid transport element. When the aerosol-generating element is activated, liquid aerosol-forming substrate in the liquid transport element is vaporised by the aerosol-generating element to form a supersaturated vapour. The supersaturated vapour is mixed with and carried in an airflow. During the flow, the vapour condenses to form an aerosol.

The aerosol-generating element may comprise a vibratable element, such as a piezoelectric element. The vibratable element may comprise electrical contacts configured to enable an electrical connection to a power supply.

The aerosol-generating element may comprise a susceptor, wherein the susceptor is configured to aerosolise the liquid aerosol-forming substrate when the susceptor is inductively heated.

The aerosol-generating element may comprise an electric heater. The electric heater may comprise electrical contacts configured to enable an electrical connection to a power supply. The electric heater may be a resistive heater. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation, 1999 Broadway Suite 4300, Denver Colorado. In composite materials, the electrically resistive material may optionally be embedded in, encapsulated, or coated with an insulating material or vice-versa, depending on the kinetics of energy transfer and the external physicochemical properties required. The electric heater may comprise a metallic etched foil insulated between two layers of an inert material. The inert material may comprise Kapton®, all-polyimide or mica foil. Kapton® is a registered trade mark of E.I. du Pont de Nemours and Company, 1007 Marchket Street, Wilmington, Delaware 19898, United States of America.

The electric heater may comprise an infra-red heating element, a photonic source, or an inductive heating element.

The electric heater may take any suitable form. The electric heater may take the form of a casing or substrate having different electro-conductive portions, or an electrically resistive metallic tube. The electric heater may be a disk (end) heating element or a combination of a disk heating element with heating needles or rods. In example embodiments in which the aerosol-generating article comprises a liquid transport element, the electric heater may comprise a flexible sheet of material arranged to surround or partially surround a second end of the liquid transport element. Other possibilities include a heating wire or filament, for example a Ni—Cr, platinum, tungsten or alloy wire, or a heating plate. Optionally, the electric heater may be deposited in or on a rigid carrier material.

According to some example embodiments, there is provided an aerosol-generating system comprising an aerosol-generating article, an aerosol-generating element configured for aerosolising the liquid aerosol-forming substrate of the aerosol-generating article, and an aerosol-generating device. The aerosol-generating device comprises an electrical power supply and a controller for controlling a supply of electrical power from the electrical power supply to the aerosol-generating element. The aerosol-generating system is configured so that the hydrochromic material of the aerosol-generating article is visible from the exterior of the aerosol-generating system.

In aerosol-generating systems according to some example embodiments, the hydrochromic material is visible from the exterior of the aerosol-generating system. Therefore, the hydrochromic material can be observed during use of the aerosol-generating system to determine when the liquid aerosol-forming substrate has been exhausted.

At least one of the aerosol-generating article and the aerosol-generating device may comprise a translucent portion or a transparent portion overlying the hydrochromic material. In an example embodiment, the aerosol-generating article comprises a translucent portion or a transparent portion overlying the hydrochromic material.

The aerosol-generating device may comprise a housing defining a cavity for receiving at least part of the aerosol-generating article. In such example embodiments, the housing may comprise a translucent portion or a transparent portion configured to overlie the hydrochromic material when at least a portion of the aerosol-generating article is received within the cavity.

The aerosol-generating element may form part of the aerosol-generating article. The aerosol-generating device may comprise electrical contacts configured to electrically connect with electrical contacts on the aerosol-generating element.

Alternatively, the aerosol-generating element may form part of the aerosol-generating device.

The aerosol-generating element may also be provided separately from both the aerosol-generating article and the aerosol-generating device, wherein the aerosol-generating element is combined with the aerosol-generating article and the aerosol-generating device to form the aerosol-generating system. In example embodiments in which the aerosol-generating element is configured for use with multiple aerosol-generating articles, an aerosol-generating element that is provided separately from both the aerosol-generating article and the aerosol-generating device may be beneficial. For example, an aerosol-generating element that is provided separately from the aerosol-generating article and the aerosol-generating device may facilitate cleaning of the aerosol-generating element. The aerosol-generating device may comprise electrical contacts configured to electrically connect with electrical contacts on the aerosol-generating element.

Suitable aerosol-generating elements are described herein.

The electrical power supply may comprise a direct current (DC) source. In some example embodiments, the electrical power supply comprises a battery. The electrical power supply may comprise a Nickel-metal hydride battery, a Nickel-cadmium battery, or a Lithium-based battery, for example a Lithium-Cobalt, a Lithium-Iron-Phosphate or a Lithium-Polymer battery.

The aerosol-generating device may further comprise an electronic photosensor configured to sense an optical property of the hydrochromic material of the aerosol-generating article when the aerosol-generating article is combined with the aerosol-generating device. The controller is configured to monitor a value of the sensed optical property when the aerosol-generating device is operated in combination with the aerosol-generating article. The controller is configured to control/permit a supply of electrical power from the electrical power supply to the aerosol-generating element when the value of the sensed optical property is within a first range indicative of the first colour. Conversely, the controller is configured to prevent/halt a supply of electrical power from the electrical power supply to the aerosol-generating element when the value of the sensed optical property is outside the first range and indicative of the second colour. This may be beneficial in example embodiments in which the aerosol-generating element comprises an electric heater, since the controller is configured to prevent further heating of the aerosol-generating article when the second colour is detected. That is, the controller is configured to prevent further heating when the liquid aerosol-forming substrate has been exhausted.

The controller may be configured to repeatedly measure the value of the sensed optical property during the operation of the aerosol-generating device in combination with the aerosol-generating article to determine when the value of the sensed optical property no longer falls within the first range. For instance, the controller may be configured to periodically measure the value of the sensed optical property (e.g., at regular intervals). Alternatively, the controller may be configured to continuously measure the value of the sensed optical property during the operation of the aerosol-generating device in combination with the aerosol-generating article.

The controller may be configured to estimate the amount of liquid aerosol-forming substrate remaining in the aerosol-generating article based on the measured value of the sensed optical property of the hydrochromic material. As described herein, the hydrochromic material may gradually change from the first colour to the second colour as the liquid aerosol-forming substrate is depleted. The aerosol-generating device may comprise a feedback device for providing feedback indicative of the estimated amount of liquid aerosol-forming substrate remaining.

The optical property may comprise at least one of reflectance, absorbance, transmittance, colour, and combinations thereof.

According to some example embodiments, there is provided an aerosol-generating device configured for combination with an aerosol-generating article. The aerosol-generating device may be configured for combination with an aerosol-generating article discussed herein. The aerosol-generating device may comprise an electrical power supply, an electronic photosensor, and a controller. The electronic photosensor is configured to sense an optical property of a portion of an aerosol-generating article when the aerosol-generating article is combined with the aerosol-generating device. The controller is configured to monitor a value of the sensed optical property when the aerosol-generating device is operated in combination with an aerosol-generating article. The controller is configured to control a supply of electrical power from the electrical power supply to an aerosol-generating element when the value of the sensed optical property is within a first range. Conversely, the controller is configured to prevent a supply of electrical power from the electrical power supply to the aerosol-generating element when the value of the sensed optical property is outside the first range. The first range may comprise any value above or below a predetermined or desired threshold value.

The controller is configured to repeatedly measure the value of the sensed optical property during the operation of the aerosol-generating device in combination with an aerosol-generating article to determine when the value of the sensed optical property no longer falls within the first range. For instance, the controller may be configured to periodically measure the value of the sensed optical property. Alternatively, the controller may be configured to continuously measure the value of the sensed optical property during the operation of the aerosol-generating device in combination with an aerosol-generating article.

The controller may be configured to estimate the amount of a liquid aerosol-forming substrate remaining in the aerosol-generating article based on the measured value of the sensed optical property. In example embodiments in which the aerosol-generating device is configured for use with an aerosol-generating article, the controller may be configured to estimate the amount of liquid aerosol-forming substrate remaining in the liquid storage portion based on a measured value of a sensed optical property of the hydrochromic material. The hydrochromic material may gradually change from the first colour to the second colour as the liquid aerosol-forming substrate is depleted. The aerosol-generating device may comprise a feedback device for providing feedback indicative of the estimated amount of liquid aerosol-forming substrate remaining.

In example embodiments in which the controller is configured for combination with an aerosol-generating article, values of the sensed optical property within the first range may be indicative of the first colour of the hydrochromic material. Values of the sensed optical property outside the first range may be indicative of the second colour of the hydrochromic material.

The optical property may comprise at least one of reflectance, absorbance, transmittance, colour, and combinations thereof.

The aerosol-generating device is configured for combination with an aerosol-generating article. That is, the aerosol-generating device is configured to be operatively connected with an aerosol-generating article. The aerosol-generating device may comprise a cavity for receiving at least a portion of an aerosol-generating article. The aerosol-generating device may comprise an attachment portion for releasably attaching the aerosol-generating device to an aerosol-generating article. The attachment portion may comprise a screw thread for engaging a corresponding screw thread on an aerosol-generating article. The attachment portion may be configured to engage a corresponding attachment portion on an aerosol-generating article by an interference fit.

The aerosol-generating device may further comprise an aerosol-generating element. Suitable aerosol-generating elements are described herein.

The aerosol-generating device may be configured for combination with an aerosol-generating article comprising an aerosol-generating element. The aerosol-generating device may also be configured for combination with an aerosol-generating article and a separate aerosol-generating element. The aerosol-generating device may comprise electrical contacts configured to electrically connect with electrical contacts on an aerosol-generating element.

The aerosol-generating device may comprise any of the optional features described herein with reference to aerosol-generating devices forming part of the aerosol-generating system.

The aerosol-generating device may be combined with the aerosol-generating article to form an aerosol-generating system.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
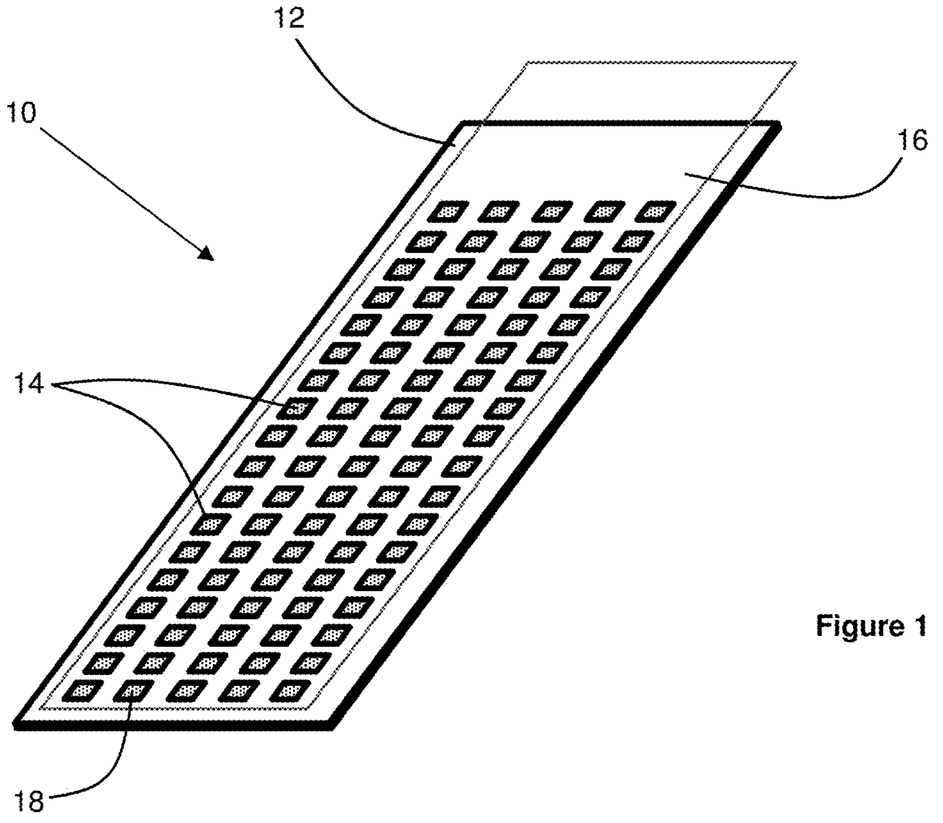
FIG. 1 shows an aerosol-generating article according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., “beneath,” “below,” “lower,” “above,” “upper,” and the like) may be used herein for ease of description to describe one element or feature’s relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the term “below” may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms “a,” “an,” and “the” are intended to include the plural forms as well, unless the context clearly indicates otherwise. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 shows an aerosol-generating article 10 according to an example embodiment. The aerosol-generating article 10 comprises a base layer 12 and a plurality of discrete liquid storage portions 14 positioned on the base layer 12. A removable cover layer 16 is secured to the base layer 12 so that the plurality of liquid storage portions 14 are sealed between the base layer 12 and the cover layer 16.

Each of the liquid storage portions 14 comprises a porous substrate material and a liquid aerosol-forming substrate sorbed onto the porous substrate material. A hydrochromic material 18 is provided on a surface of each of the porous substrate materials. The hydrochromic material 18 is configured to be substantially transparent when in contact with the liquid aerosol-forming substrate so that the colour of the underlying porous substrate material is visible.

Figure 2:
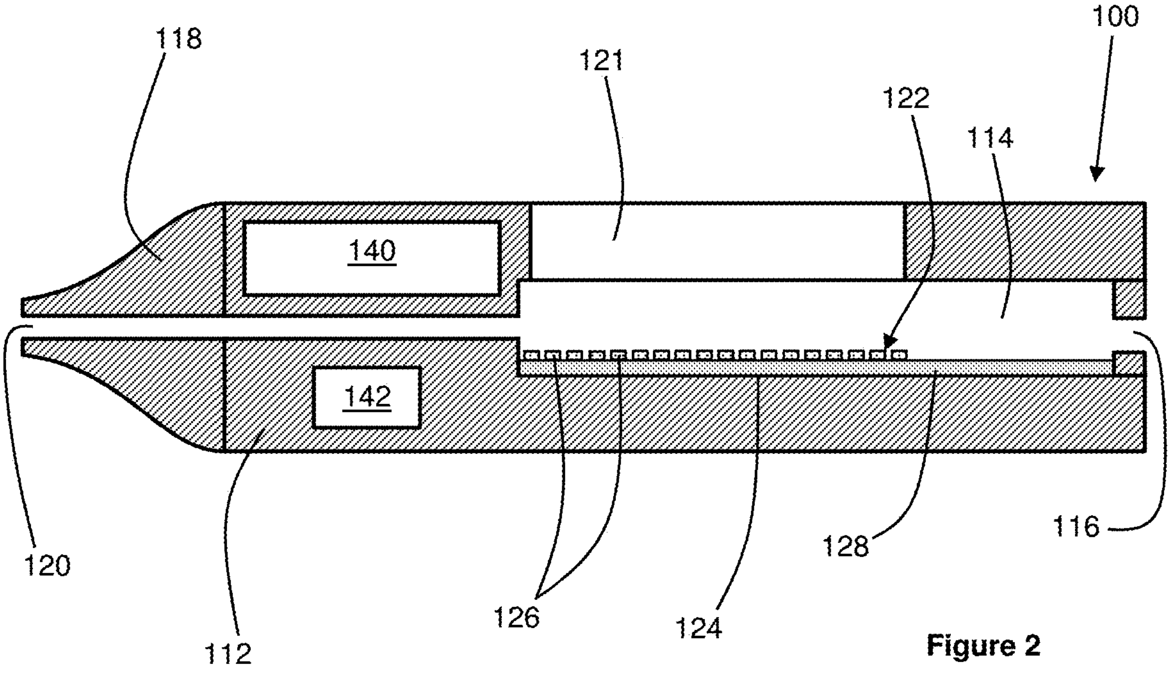
FIG. 2 shows an aerosol-generating device for use with the aerosol-generating article of FIG. 1.

FIG. 2 shows a cross-sectional view of an aerosol-generating device 100 for use with the aerosol-generating article 10 of FIG. 1. The aerosol-generating device 100 comprises a housing 112 defining a cavity 114 for receiving the aerosol-generating article 10. An air inlet 116 is provided at an upstream end of the cavity 114 and a mouthpiece 118 is provided at a downstream end of the housing 112. An air outlet 120 is provided in the mouthpiece 118 in fluidic communication with the cavity 114 so that an airflow path is defined through the cavity 114 between the air inlet 116 and the air outlet 120. During use, a negative pressure is applied to the mouthpiece 118 to draw air into the cavity 114 through the air inlet 116 and out of the cavity 114 through the air outlet 120.

A transparent window 121 provided in the housing 112 allows the observation of the aerosol-generating article 10 when the aerosol-generating article 10 is received within the cavity 114.

The aerosol-generating device 100 further comprises a plurality of aerosol-generating elements 122 provided on a planar wall 124 of the cavity 114. Each of the aerosol-generating elements 122 comprises an electric heater element 126 provided on a common support layer 128.

The aerosol-generating device 100 further comprises an electrical power supply 140 and a controller 142 positioned within the housing 112. During the operation of the aerosol-generating device 100, the controller 142 controls a supply of electrical current from the electrical power supply 140 to each aerosol-generating element 122 to activate the aerosol-generating element 122. The controller 142 may be configured to activate the plurality of aerosol-generating elements 122 in groups, with each group being activated and deactivated sequentially.

Figure 3:
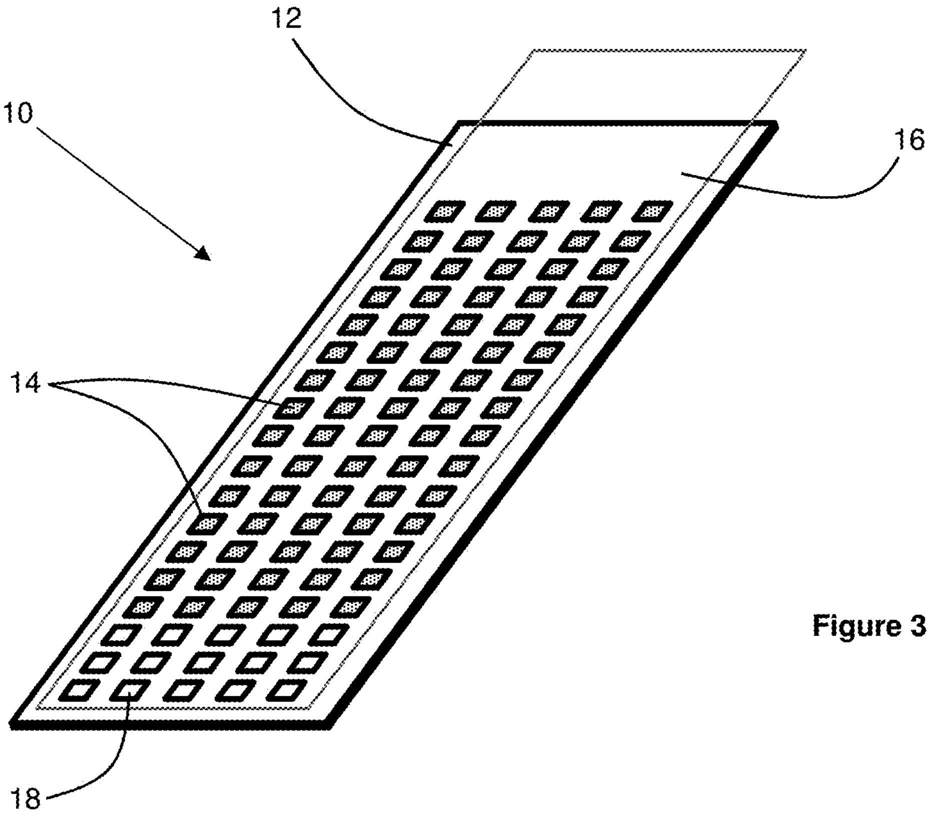
FIG. 3 shows the aerosol-generating article of FIG. 1 after partial use.

During use, the aerosol-generating article 10 is inserted into the cavity 114 so that the aerosol-generating article 10 and the aerosol-generating device 100 form an aerosol-generating system. The controller 142 then sequentially activates and deactivates the aerosol-generating elements 122 to sequentially heat the discrete liquid storage portions 14. Each time a liquid storage portion 14 is heated the liquid aerosol-forming substrate is aerosolised until substantially no liquid aerosol-forming substrate remains in the porous substrate material. In the absence of the liquid aerosol-forming substrate, the hydrochromic material 18 on the porous substrate material changes from being substantially transparent to an opaque colour, such as white. FIG. 3 shows the aerosol-generating article 10 of FIG. 1 after some of the liquid storage portions 14 have been heated and the hydrochromic material 18 has been transformed from substantially transparent to white.

During use, the aerosol-generating article 10 may be observed through the transparent window 121 of the aerosol-generating device 100 to inspect the colour of the hydrochromic material 18 on each liquid storage portion 14. In this way, it can be determined how many of the liquid storage portions 14 have been heated.

Figure 4:
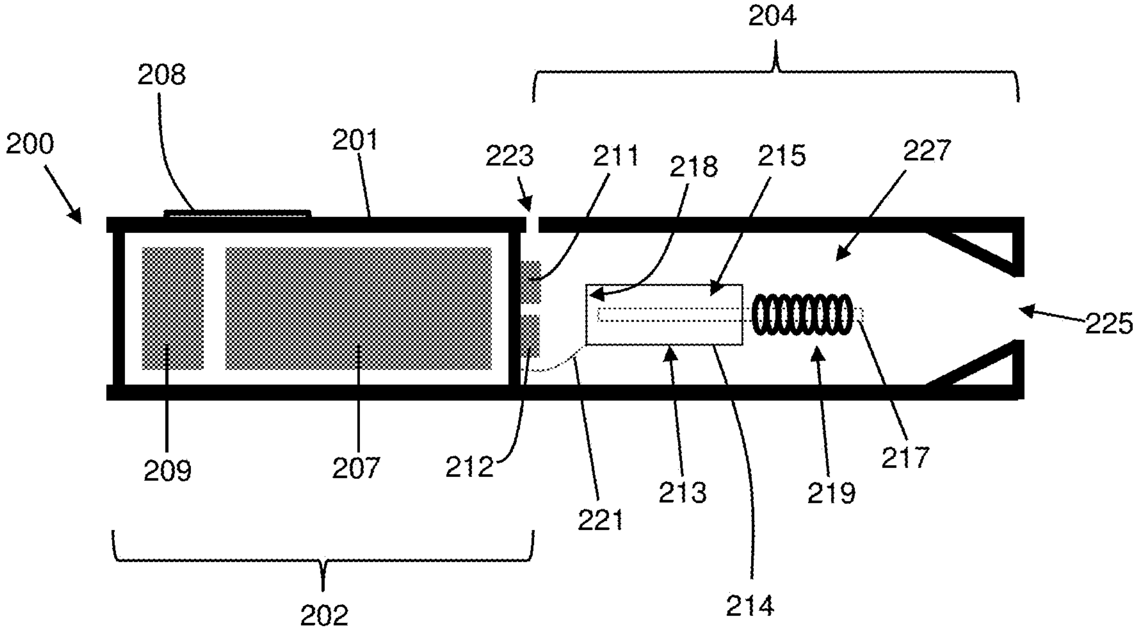
FIG. 4 shows an aerosol-generating system according to an example embodiment.

FIG. 4 shows an aerosol-generating system 200 according to an example embodiment. The aerosol-generating system 200 comprises an aerosol-generating device 202 and an aerosol-generating article 204 removably attached to the aerosol-generating device 202. The aerosol-generating system 200 may be an electronic smoking system in which the aerosol-generating device 202 is a main body of the electronic smoking system, and the aerosol-generating article 204 is a replaceable cartridge, such as a cartomiser.

The aerosol-generating device 202 comprises a housing 201, an electrical power supply 207, a feedback device 208, a controller 209, a puff detection system 211, and an electronic photosensor 212.

The aerosol-generating article 204 comprises a liquid storage portion 213 comprising a transparent liquid storage container 214 containing a liquid aerosol-forming substrate 215. The aerosol-generating article 204 further comprises a liquid transport element in the form of a capillary wick 217, and an aerosol-generating element 219 comprising an electric heater. A first end of the capillary wick 217 extends into the liquid storage container 214, and a second end of the capillary wick 217 is surrounded by the electric heater. The electric heater is connected to the aerosol-generating device 202 via electrical connections 221.

A hydrochromic material 218 is provided on an internal surface of the liquid storage container 214, in contact with the liquid aerosol-forming substrate 215. The hydrochromic material 218 is configured to exhibit a first colour when in contact with the liquid aerosol-forming substrate and a second colour when the liquid aerosol-forming substrate 215 has been exhausted from the liquid storage container 214. The first colour may be transparent and the second colour may be opaque.

The aerosol-generating article 204 also includes an air inlet 223, an air outlet 225, and an aerosol-forming chamber 227.

During use, liquid aerosol-forming substrate 215 is transferred or conveyed by capillary action from the liquid storage container 214 from the first end of the wick 217 to the second end of the wick 217, which is surrounded by the electric heater. When a negative pressure is applied at the air outlet 225, ambient air is drawn through air inlet 223. The puff detection system 211 senses the puff and activates the electric heater. The electrical power supply 207 supplies energy to the electric heater to heat the end of the wick 217 surrounded by the electric heater. The liquid aerosol-forming substrate 215 in the second end of the wick 217 is vaporised by the electric heater to create a supersaturated vapour. At the same time, the liquid aerosol-forming substrate 215 being vaporised is replaced by further liquid aerosol-forming substrate 215 moving along the wick 217 by capillary action. The supersaturated vapour created is mixed with and carried in the airflow from the air inlet 223. In the aerosol-forming chamber 227, the vapour condenses to form an aerosol, which is carried towards the air outlet 225.

During the operation of the aerosol-generating system 200, the electronic photosensor 212 senses an optical property of the hydrochromic material 218 through the transparent liquid storage container 214. As the liquid aerosol-forming substrate 215 is depleted from the liquid storage container 214, the hydrochromic material 218 gradually changes from the first colour to the second colour. The controller 209 monitors the value of the sensed optical property and continuously estimates the amount of liquid aerosol-forming substrate 215 remaining in the liquid storage container 214. The estimated amount of liquid aerosol-forming substrate 215 remaining is displayed on the feedback device 208. When the value of the sensed optical property of the hydrochromic material 218 is indicative of the second colour, the controller 209 prevents further activation of the electric heater.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An aerosol-generating article comprising:

a storage portion containing an aerosol-forming substrate;

a hydrochromic material configured to indicate an amount of the aerosol-forming substrate in the storage portion; and a base layer on which the storage portion is disposed, the storage portion being in a form of a plurality of discrete portions on the base layer.

2. The aerosol-generating article of claim 1, wherein the aerosol-forming substrate is a liquid.

3. The aerosol-generating article of claim 1, wherein the aerosol-forming substrate includes nicotine.

4. The aerosol-generating article of claim 1, wherein at least a part of the storage portion is transparent or translucent to permit a viewing of the hydrochromic material within.

5. The aerosol-generating article of claim 1, wherein the hydrochromic material is on an internal surface of the storage portion.

6. The aerosol-generating article of claim 1, wherein the storage portion includes a porous material onto which the aerosol-forming substrate is absorbed.

7. The aerosol-generating article of claim 6, wherein the hydrochromic material is on an outer surface of the porous material.

8. The aerosol-generating article of claim 1, wherein the plurality of discrete portions are arranged in an array.

9. The aerosol-generating article of claim 1, wherein the plurality of discrete portions are arranged in groups configured for sequential heating.

10. The aerosol-generating article of claim 1, further comprising:

a cover layer secured to the base layer so as to seal the storage portion in between, the cover layer configured for removal prior to an insertion of the aerosol-generating article into an aerosol-generating device.

11. The aerosol-generating article of claim 1, wherein the hydrochromic material is configured to gradually change from a first color to a second color as the aerosol-forming substrate is depleted.

12. The aerosol-generating article of claim 1, wherein the aerosol-forming substrate includes water, and the hydrochromic material is configured to change color in response to a presence or absence of water.

13. The aerosol-generating article of claim 1, wherein the hydrochromic material is configured to change to a white color that is opaque in an absence of the aerosol-forming substrate.

14. The aerosol-generating article of claim 1, wherein the hydrochromic material includes at least one of an ink or a paint on the storage portion.

15. The aerosol-generating article of claim 1, wherein the storage portion is in a form of a container defining an outlet configured for delivery of the aerosol-forming substrate therefrom.

16. The aerosol-generating article of claim 15, further comprising:

a transport element extending through the outlet of the container, the transport element configured to draw the aerosol-forming substrate from the container via capillary action.

17. The aerosol-generating article of claim 16, further comprising:

an aerosol-generating element configured to heat the aerosol-forming substrate in the transport element to generate an aerosol.

18. The aerosol-generating article of claim 17, wherein the aerosol-generating element includes an electric heater.

* * * * *